US011863397B2

(12) United States Patent
Han et al.

(10) Patent No.: US 11,863,397 B2
(45) Date of Patent: Jan. 2, 2024

(54) TRAFFIC PREDICTION METHOD, DEVICE, AND STORAGE MEDIUM

(71) Applicants: ZTE CORPORATION, Guangdong (CN); Beijing University of Posts and Telecommunications, Beijing (CN)

(72) Inventors: Jing Han, Guangdong (CN); Baisheng Zhang, Guangdong (CN); Jianwei Liu, Guangdong (CN); Xingquan Zuo, Beijing (CN); Yonghao Gu, Beijing (CN); Yangfan Xu, Beijing (CN); Jin Huang, Beijing (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/782,993

(22) PCT Filed: Oct. 21, 2020

(86) PCT No.: PCT/CN2020/122552
§ 371 (c)(1),
(2) Date: Jun. 6, 2022

(87) PCT Pub. No.: WO2021/129086
PCT Pub. Date: Jul. 1, 2021

(65) Prior Publication Data
US 2023/0028574 A1    Jan. 26, 2023

(30) Foreign Application Priority Data
Dec. 25, 2019   (CN) .......................... 201911359122.9

(51) Int. Cl.
*H04L 41/142*    (2022.01)
*H04L 41/147*    (2022.01)
*H04L 43/0876*   (2022.01)

(52) U.S. Cl.
CPC .......... *H04L 41/142* (2013.01); *H04L 41/147* (2013.01); *H04L 43/0876* (2013.01)

(58) Field of Classification Search
CPC .. H04L 41/142; H04L 41/147; H04L 43/0876
See application file for complete search history.

(56) References Cited

U.S. PATENT DOCUMENTS

| 2014/0111517 | A1* | 4/2014 | Vela ........................ H04W 4/24 345/440 |
|---|---|---|---|
| 2017/0249649 | A1 | 8/2017 | Garvey et al. |
| 2019/0028537 | A1 | 1/2019 | Krishna Singuru |

FOREIGN PATENT DOCUMENTS

| CN | 102568205 A | 7/2012 |
|---|---|---|
| CN | 107026763 A | 8/2017 |

(Continued)

OTHER PUBLICATIONS

Yiping, Lian, "Traffic flow forecast based on EMD and LSSVM combination model", Electronic Design Engineering, Jun. 30, 2019, 5 pgs.

(Continued)

*Primary Examiner* — Philip C Lee
(74) *Attorney, Agent, or Firm* — Vivacqua Crane, PLLC

(57) ABSTRACT

Embodiments of the present disclosure relate to the field of communications, and disclose a traffic prediction method, including: acquiring traffic data of a first preset time period in a historical period, and pre-processing the traffic data; performing empirical mode decomposition (EMD) on pre-processed traffic data to obtain a plurality of component series; using a time series prediction model to fit the plurality of component series, and using a fitted time series prediction model to obtain a plurality of component prediction results for a second preset time period; accumulating all the component prediction results to obtain a traffic prediction result (Continued)

for the second preset time period. The present disclosure further provides a traffic prediction device and a storage medium.

17 Claims, 7 Drawing Sheets

(56) References Cited

FOREIGN PATENT DOCUMENTS

| | | | | |
|---|---|---|---|---|
| CN | 107426026 A | * | 12/2017 | ............ G06F 17/18 |
| CN | 107730887 A | | 2/2018 | |
| CN | 107809737 A | | 3/2018 | |
| CN | 109657831 A | | 4/2019 | |
| CN | 109802862 A | | 5/2019 | |
| CN | 110175711 A | | 8/2019 | |
| CN | 110210658 A | | 9/2019 | |
| CN | 110381523 A | | 10/2019 | |

OTHER PUBLICATIONS

Kit Yan Chan, et al., "Prediction of Short-Term Traffic Variables Using Intelligent Swarm-Based Neural Networks", IEEE Transactions on Control Systems Technology, Jan. 31, 2013, 12 pgs.

Pin Jiang, "Research on cellular network base station traffic analysis and prediction based on machine learning", Beijing University of Posts and Telecommunications, Jun. 3, 2019, 78 pgs.

ZTE Corporation, et al., International Search Report with English translation, PCT/CN2020/122552, dated Jan. 20, 2021, 7 pgs.

The State Intellectual Property Office of People's Republic of China. First Office Action for CN Application No. 201911359122.9 and English translation, dated Jul. 19, 2023, pp. 1-10.

The State Intellectual Property Office of People's Republic of China. First Search Report for CN Application No. 201911359122.9 and English translation, dated Jul. 12, 2023, pp. 1-10.

* cited by examiner

TRAFFIC PREDICTION METHOD, DEVICE, AND STORAGE MEDIUM

CROSS REFERENCE TO RELATED APPLICATIONS

The present application is a United States National Stage Application filed under 35 U.S.C. § 371 of PCT Patent Application Serial No. PCT/CN2020/122552, filed Oct. 21, 2020, which claims priority to Chinese Patent Application No.201911359122.9, entitled "TRAFFIC PREDICTION METHOD, DEVICE, AND STORAGE MEDIUM," filed Dec. 25, 2019, each of which is incorporated by reference herein in its entirety.

TECHNICAL FIELD

The embodiments of the present disclosure relate to the field of communications, and in particular, to a traffic prediction method, a device, and a storage medium.

BACKGROUND

With the development of wireless communication technology, the scale of the Internet continues to increase, and people's habit of surfing the Internet and demand for traffic have also changed dramatically. Whether a base station could provide stable and reliable wireless traffic transmission services may directly affect service quality of an operator. Traffic of cells of a base station during a time period in the future may be predicted, which in combination with a traffic threshold of the base station may provide a reference for capacity expansion and contraction of the base station, so as to ensure reasonable allocation of resources and user service quality.

However, the inventor finds that there is at least the following problem in the prior art: when performing traffic prediction, if there is a large fluctuation in historical traffic data, prediction accuracy of a traditional algorithm model is low.

SUMMARY

The purpose of embodiments of the present disclosure is to provide a traffic prediction method, a device, and a storage medium.

In order to solve the above technical problem, some embodiments of the present disclosure provide a traffic prediction method, including: acquiring traffic data of a first preset time period in a historical period, and preprocessing the traffic data; performing empirical mode decomposition on preprocessed traffic data to obtain a plurality of component series; using a time series prediction model to fit the plurality of component series to obtain fitted time series prediction model, and using the fitted time series prediction model to obtain a plurality of component prediction results for a second preset time period; and accumulating all the component prediction results to obtain a traffic prediction result for the second preset time period.

Some embodiments of the present disclosure further provide a traffic prediction device, including: at least one processor; and a memory communicatively connected to the at least one processor; where the memory stores an instruction executable by the at least one processor, where the instruction, when executed by the at least one processor, causes the at least one processor to perform the above-mentioned traffic prediction method.

Some embodiments of the present disclosure further provide a computer-readable storage medium storing a computer program that, when executed by the processor, causes the processor to perform the above-mentioned traffic prediction method.

BRIEF DESCRIPTION OF THE DRAWINGS

One or more embodiments are exemplified by pictures in the corresponding accompanying drawings, and these exemplified descriptions do not constitute limitations on the embodiments.

DETAILED DESCRIPTION

In order to make the objectives, technical solutions and advantages of the present invention clearer, the embodiments of the present disclosure will be described in detail below with reference to the accompanying drawings. However, it will be apparent to those skilled in the art that, in various embodiments of the present disclosure, numerous technical details are set forth in order to provide the reader with a better understanding of the present disclosure. However, the technical solutions claimed in the present disclosure may be implemented without these technical details and various changes and modifications based on the following embodiments.

A first embodiment of the present disclosure relates to a traffic prediction method. The core of this embodiment lies in: acquiring historical traffic data and preprocessing the historical traffic data; performing empirical modal decomposition on the preprocessed historical traffic data to obtain a plurality of component series; using a time series prediction model to predict each of the component series respectively to obtain a component prediction result of each of the component series; and accumulating all component prediction results to obtain a traffic prediction result, so that accuracy of a traffic prediction is improved. The implementation details of the traffic prediction method of this embodiment will be specifically described below, and the following contents are only provided for convenience of understanding, which are not necessary for implementing this solution.

Figure 1:
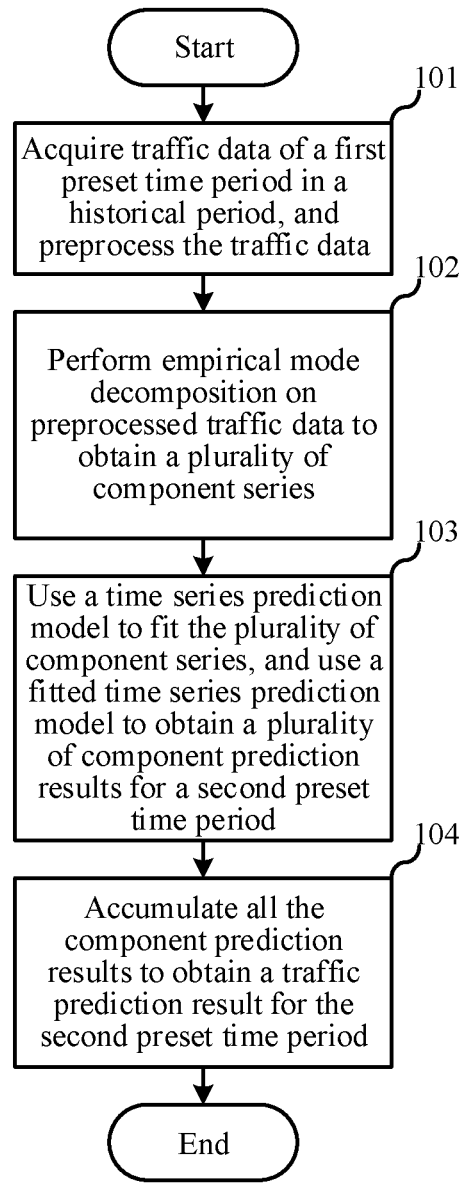
FIG. 1 is a flow diagram illustrating a traffic prediction method according to a first embodiment of the present disclosure.

The traffic prediction method in this embodiment is shown in FIG. 1.

In 101, traffic data of a first preset time period in a historical period is acquired, and the traffic data is preprocessed.

Specifically, in an actual application scenario, before predicting traffic of a plurality of cells of a same base station for a certain time period in the future, traffic data of the cells in the historical period collected by an operator is first acquired.

In an exemplary embodiment, traffic data of each day in the first preset time period in the historical period is acquired, and the traffic data of each day is defined as a traffic value at a time within 24 hours of a day when a utilization rate of physical resource blocks(prb) is the largest. It should be noted that acquiring the traffic data of each day in the first preset time period in the historical period is not limited to acquiring the traffic value at the time within 24 hours of each day when the utilization rate of the prb is the largest, and other methods may also be used to determine the traffic data of each day. For example, an average traffic within 24 hours of each day may be taken as the traffic data of each day, or a maximum traffic within 24 hours of each day may be taken as the traffic data of each day, etc., which will not be described in detail.

Next, since the traffic data is stored in a plurality of files, it is necessary to merge the traffic data into one file, and it is also necessary to process missing values and abnormal values in the traffic data.

In an exemplary embodiment, when the traffic data is merged into one file, the traffic data needs to be filtered to obtain field attribute information required by traffic prediction. In this embodiment, the field attribute information required by traffic prediction includes: a traffic data size ([LTE]DL CELL PDCP SDU Volume (Kbyte)), a traffic collection date (Date), a traffic collection time (Time), and a collection area number (Cell) and a base station number (EnodeB), etc. Herein, two variables EnodeB and Cell may be used to identify the cell (the two variables determine a uniquely identified cell), and a num column may also be added to a determined cell for numbering.

In an exemplary embodiment, processing the missing values in this embodiment includes removing the missing values. The missing values occurs in such a situation: numbered cells (usually cells with fields of null values) do not have corresponding collected traffic data size values, traffic collection dates, or traffic collection times after the data is unified into one file. In a preprocessing process, data of the above-mentioned cells maybe directly removed to prevent the missing values from affecting prediction results and improve accuracy of the prediction.

Figure 2:
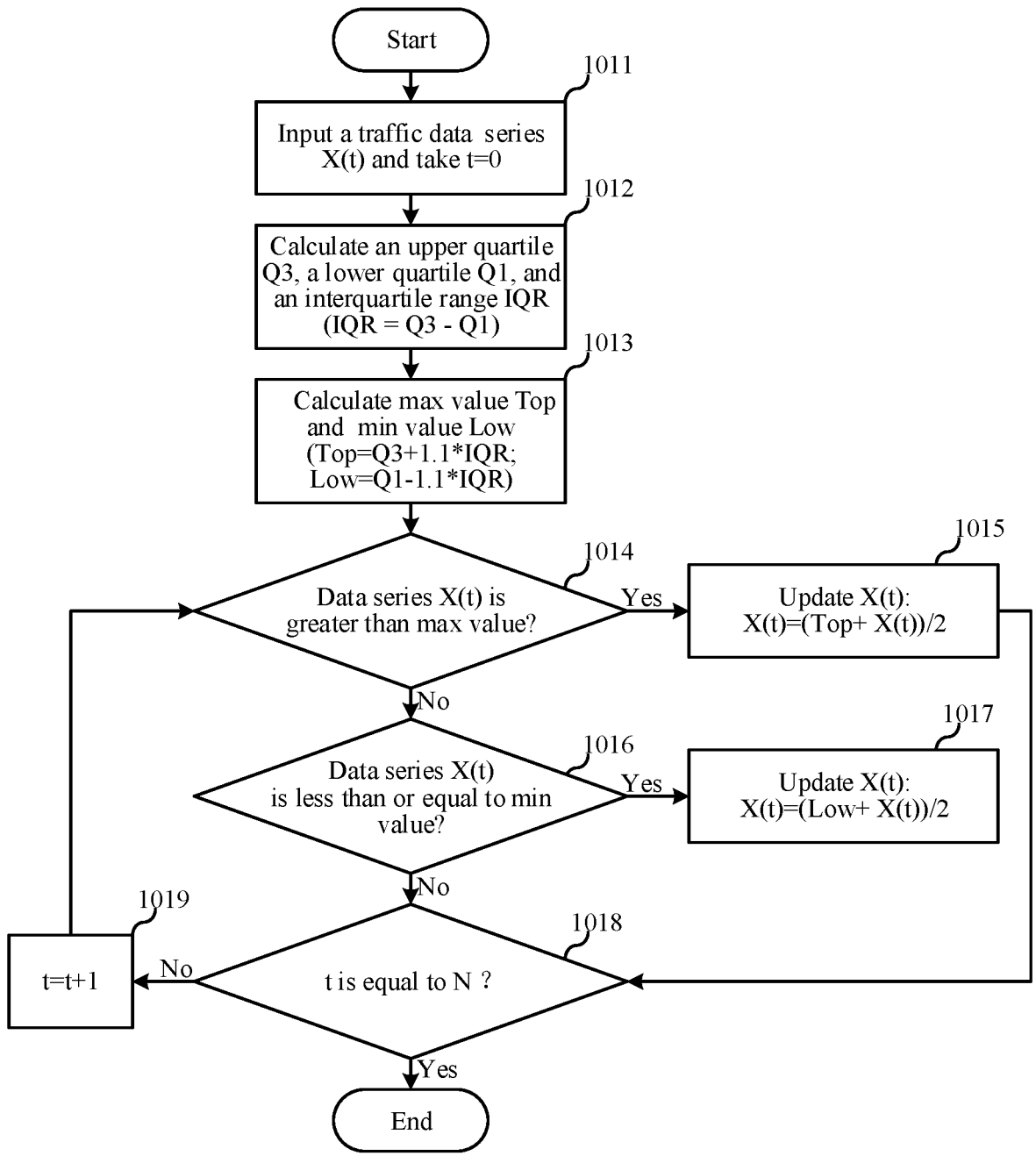
FIG. 2 is a flow diagram illustrating processing of abnormal data by using a boxplot method according to the first embodiment of the present disclosure.

In an exemplary embodiment, the abnormal values are processed by a boxplot method in this embodiment. The abnormal values refer to outliers in traffic data that deviate greatly from a normal value in size. Assuming that a certain region collects traffic data of 211 days in total, the outliers of the traffic data are processed by calculating quartile values of these traffic data. The abnormal data in the historical traffic data is processed by the boxplot method, so that influence of the abnormal data on subsequent prediction for the component series by using the time series prediction model is reduced, thereby improving accuracy of the traffic prediction. As shown in FIG. 2, processing the abnormal data in the historical traffic data by the boxplot method specifically includes following operations.

In operation 1011, a data series X(t) is input (where, X(t) is a time series about the traffic value, where time t represents a certain day), taking t=0.

In operation 1012, an upper quartile Q3, a lower quartile Q1, and an interquartile range IQR are calculated (IQR=Q3−Q1).

In operation 1013, a maximum value Top and a minimum value Low are calculated, and calculation formulas are:

$$Top = Q3 + 1.1 * IQR$$

$$Low = Q1 - 1.1 * IQR$$

In operation 1014, whether the data series X(t) is greater than the maximum value is determined. In response to the data series X(t) being greater than the maximum value, operation 1015 is performed; in response to the data series X(t) being less than or equal to the maximum value, operation 1016 is performed.

In operation 1015, X(t) is updated, and the following update formula may be used:

$$X(t) = (Top + X(t))/2$$

In operation 1016, whether the data series X(t) is less than or equal to the minimum value is determined. In response to the data series X(t) being less than or equal to the minimum value, operation 1017 is performed; in response to the data series X(t) being greater than the minimum value, operation 1018 is performed.

In operation 1017, X(t) is updated, and the following update formula may be used:

$$X(t) = (Low + X(t))/2$$

In operation 1018, whether t is equal to N (in this example, N=211) is determined. In response to t not being equal to N, operation 1019 is performed; in response to t being equal to N, the processing of the abnormal values of the data series X(t) is completed.

In operation 1019, t=t+1, a next traffic value of the X(t) series is acquired for processing.

Influence of the outliers on the prediction result may be reduced by processing the outliers in the traffic data through the above operations.

In operation 102, empirical mode decomposition is performed on the preprocessed traffic data to obtain the plurality of component series.

Specifically, empirical mode decomposition (EMD decomposition) is performed on the preprocessed historical traffic data to obtain a plurality of intrinsic mode function (IMF) components and a residual component. A single reconstruction is performed on series corresponding to each component.

Figure 3:
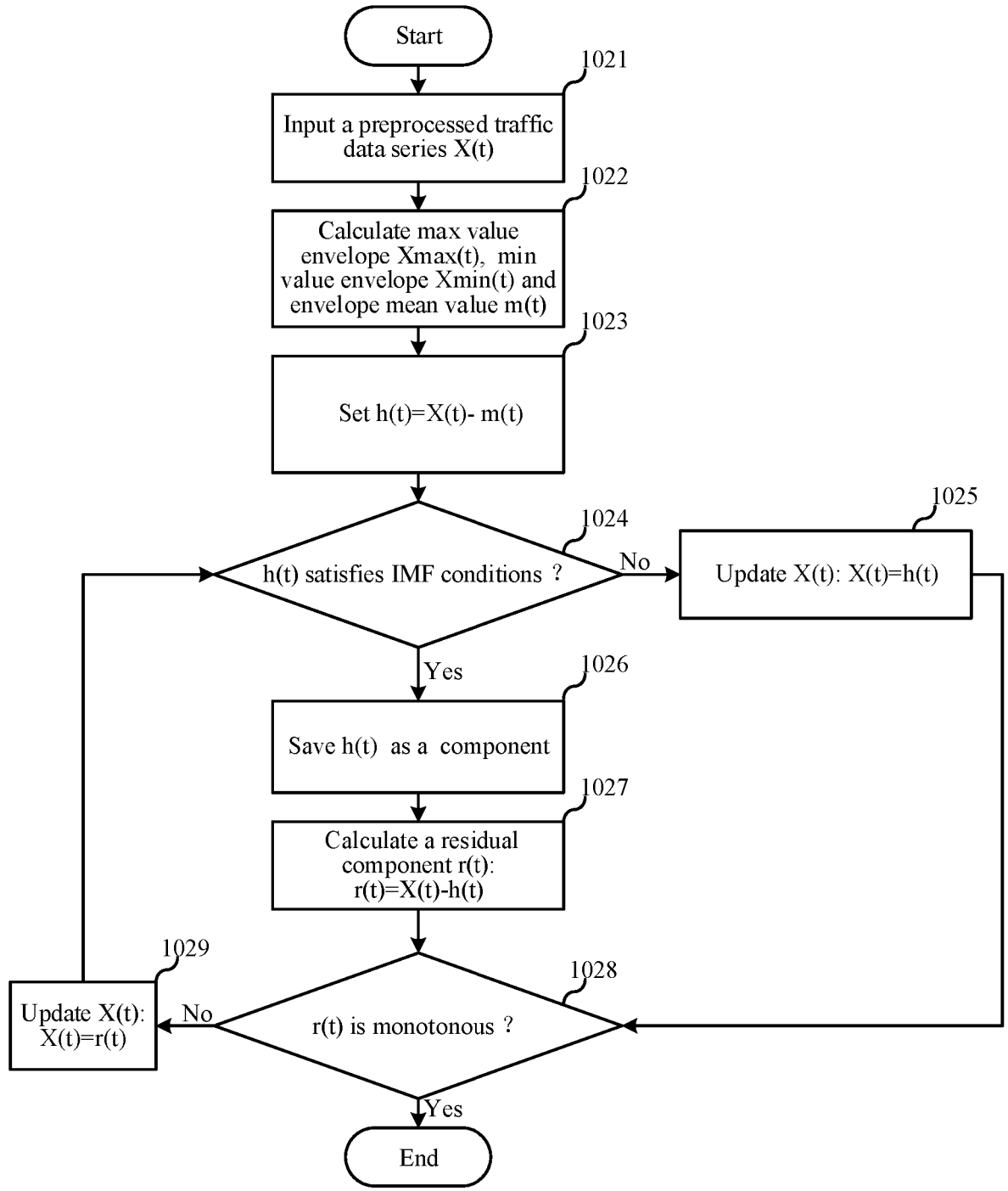
FIG. 3 is a flow diagram illustrating performing empirical mode decomposition according to the first embodiment of the present disclosure.

In an exemplary embodiment, EMD decomposition is performed on each cell by traversing the cells in an ascending order according to a sequence of the number of the num field in the preprocessed data in operation 101 in this embodiment. As shown in FIG. 3, performing empirical mode decomposition on the traffic data of a cell mainly include following operations.

In operation 1021, preprocessed traffic data X(t) of the cell is acquired and input ((X(t) is a time series about the traffic value, where time t represents a certain date).

In operation 1022, a maximum value envelope $X_{max}(t)$, a minimum value envelope $X_{min}(t)$ and an envelope mean value m(t) are calculated.

Specifically, a local maximum value and a local minimum value of X(t) are marked, and then a cubic spline curve fitting is used to obtain maximum value envelope $X_{max}(t)$ and minimum value envelope $X_{min}(t)$ of the local maximum values or the local minimum values, and a mean value of upper and lower envelopes $m(t) = (X_{max}(t) + X_{min}(t))/2$ is calculated.

In operation 1023, the component series h(t) of a suspected IMF component is determined, where h(t)=X(t)−m(t).

In operation 1024, whether h(t) satisfies IMF conditions is determined. In response to h(t) satisfying the IMF conditions, operation 1026 is performed; in response to h(t) not satisfying the IMF conditions, operation 1025 is performed.

Specifically, the IMF conditions include:

condition (1): in the entire dataset, the number of local maximum values is the same as the number of values greater than zero or a difference between the above two numbers is equal to one;

condition (2): at any timepoint, an average value of the upper envelope defined by the local maximum value and the lower envelope defined by the local minimum value is zero.

In operation 1025, X(t) is updated, where X(t)=h(t).

In operation 1026, h(t) is taken as the IMF component.

Specifically, if h(t) satisfies the conditions in operation 1024, h(t) may be used as the IMF component and it may be numbered as $IMF_i$, where i∈{0, 1, 2 . . . n}, and an number subscript is updated according to i=i+1.

In operation 1027, a residual component r(t) is calculated, where r(t)=X(t)−h(t).

In operation 1028, whether r(t) has a monotonous trend is determined. In response to r(t) having the monotonous trend, EMD decomposition on the traffic data of the cell is completed; in response to r(t) not having the monotonous trend, operation 1029 is performed.

In operation 1029, X(t) is updated according to X(t)=r(t);

The EMD decomposition is performed through the above operations, and finally n component series are obtained: $X(t)=IMF_0+IMF_1+IMF_2+IMF_3+IMF_4+ \ldots +IMF_{n-2}+r(t)$.

In operation 103, time series prediction model is used to fit the plurality of component series, and a fitted time series prediction model (i.e. the time series prediction model obtained after fitting the plurality of component series) is used to obtain a plurality of component prediction results of the second preset time period.

Specifically, the time series prediction model is used to fit each of the component series to obtain the fitted time series prediction model; then, the component prediction result of each of the component series for the second preset time period is determined according to the fitted time series prediction model. Herein, the time series prediction model may be one of a prophet model, an autoregressive model, a moving average model or an autoregressive moving average model. In an exemplary embodiment, the prophet model is used to fit each of the component series.

In operation 104, all the component prediction results are accumulated to obtain a traffic prediction result for the second preset time period.

Specifically, since the component prediction results are the prediction results of the component series in the second preset time period (where, the component series are obtained by performing empirical modal decomposition according to the historical traffic data), the result obtained after adding up the component prediction results is the traffic prediction result for the second preset time period.

Compared with the prior art, the embodiment of the present disclosure performs empirical modal decomposition on the preprocessed historical traffic data to obtain the plurality of component series; uses the time series prediction model to fit the plurality of component series, and uses the fitted time series prediction model to obtain the plurality of component prediction results of the second preset time period; and accumulates all the component prediction results to obtain the traffic prediction result. The empirical mode decomposition method decomposes signals according to time scale characteristics of the data itself, which does not need to set any basis functions in advance and has obvious advantages in processing non-stationary and nonlinear data. Therefore, when the historical data is decomposed into relatively stable component series by means of empirical mode decomposition, influence of large fluctuations in data on the prediction accuracy is reduced, and accuracy of the traffic prediction is improved.

A second embodiment of the present disclosure relates to a traffic prediction method. The second embodiment is substantially the same as the first embodiment, except that in an operation of using a time series prediction model to fit a plurality of component series, and using a fitted time series prediction model to obtain a plurality of component prediction results of a second preset time period, the second embodiment decomposes each of the component series into a sum of a trend term, a season term, and a noise term; determines a fitted trend item and a fitted seasonal item respectively, and then uses the fitted trend item and the fitted seasonal item to obtain a trend item prediction result and a seasonal item prediction result for the second preset time period; accumulates the trend item prediction result, the seasonal item prediction result and the noise item to obtain the component prediction result of each of the component series for the second preset time period.

The traffic prediction method in this embodiment is shown in FIG. 3, and specifically includes following operations.

In operation 201, traffic data of a first preset time period in a historical period is acquired, and the traffic data is preprocessed.

In operation 202, empirical mode decomposition is performed on preprocessed traffic data to obtain a plurality of component series.

Operations 201 to 202 are substantially the same as operations 101 to 102 in the first embodiment respectively and will not be described here to avoid repetition.

In operation 203, each of the component series is decomposed into the sum of the trend item, the seasonal item, and the noise item.

In this embodiment, a prophet model is used to predict each of the component series respectively, and the component prediction results of each of the component series are obtained.

Specifically, a seasonal and trend decomposition using Loess (STL) is firstly performed through locally weighted regression to decompose each of the component series into the sum of the trend term, the seasonal term, and the noise term, that is, $$y(t)=g(t)+s(t)+\epsilon_t$$

where t represents time, y(t) represents the component series, g(t) represents the trend term, s(t) represents the seasonal term, and $\epsilon_t$ represents the noise term.

It should be noted that the practice of "using the prophet model for component series prediction" in this operation is not necessary. In other alternative implementations, other time series models may also be used to predict each of the component series, which will not be repeated here.

In operation 204, the fitted trend item and the fitted seasonal item are determined respectively, and then the fitted trend item and the fitted seasonal item are used to obtain the trend item prediction result and the seasonal item prediction result for the second preset time period.

Specifically, the fitted trend item and the fitted seasonal item are respectively determined according to the known component series and a preset fitting function, and then the fitted trend item and the fitted seasonal item are used to obtain the trend prediction result and the seasonal item prediction result for the second preset time period.

In an exemplary embodiment, a fitting function of the trend term g(t) is:

$$g(t)=(k+a(t)^T\delta)t+(m+a(t)^T\gamma)$$

where t represents time, $(k+a(t)^T\delta)t$ represents a data traffic growth rate, m represents an offset parameter, $\delta$ represents a growth rate vector, and $\gamma_j$ is set as $-s_j\delta_j$ to make the function continuous;

$s_j$ represents a time when the prophet model has S change points, where $j=1, \ldots, S$;

a(t) is a custom vector and $$a_j(t) = \begin{cases} 1, & t \geq s_j \\ 0, & t < s_j \end{cases},$$

where T is a transpose operator.

The fitting function of the trend term incorporates trend changes in a growth model into the fitting function of the trend term by clearly defining transformation points that allow a growth rate to change. Specifically, the fitting function of the trend term is derived by the following method: assuming that the component series y(t) has S change points at the time $s_j$, where $j=1, \ldots, S$. A growth rate vector $\delta \in \mathbb{R}^S$ is defined, and $\delta_j$ is the rate change at the times $s_j$. The growth rate at any time t is the sum of a base rate k and all rate change values up to the time point:

$$k + \sum_j^{t > s_j} \delta_j$$

A vector $a(t) \in \{0,1\}^S$ is defined and the equation is as follows:

$$a_j(t) = \begin{cases} 1, & t \geq s_j \\ 0, & t < s_j \end{cases},$$

then the growth rate at anytime t is abbreviated as: $k+a(t)^T\delta$. When the rate k is adjusted, the offset m must also be adjusted to connect segment endpoints. A correct adjustment value of transformation point j is calculated as:

$$\gamma_j = \left(s_j - m - \sum_{l<j} \gamma_l\right)\left(1 - \frac{k + \sum_{l<j} \delta_l}{k + \sum_{l \leq j} \delta_l}\right).$$

In an exemplary embodiment, a fitting function of the seasonal term s(t) is a Fourier function, specifically:

$$s(t) = \left[\cos\left(\frac{2\pi(1)t}{365.25}\right), \ldots, \sin\left(\frac{2\pi(10)t}{365.25}\right)\right]\beta$$

where, $\beta \sim (0, \sigma^2)$, that is, $\beta$ follows a normal distribution, mathematical expectation of the normal distribution is 0, and a variance is $\sigma^2$.

The noise term $\epsilon_t$ represents changes that is unable to be captured by a model, and it is assumed that the noise term follows the normal distribution.

In operation 205, the trend item prediction result, the seasonal item prediction result, and the noise item are accumulated to obtain a component prediction result of each of the component series.

Specifically, the trend item prediction result $\hat{g}(t)$ and the seasonal item prediction result $\hat{s}(t)$ are obtained through operation 203. A random value following the normal distribution is taken as the noise item $\epsilon_t$, and $\hat{g}(t)$, $\hat{s}(t)$ and $\epsilon_t$ are accumulated to obtain a component prediction result of a single component series, namely:

$$\hat{y}(t)=\hat{g}(t)+\hat{s}(t)+\epsilon_t$$

where, $\hat{y}(t)$ represents the component prediction result, $\hat{g}(t)$ represents the trend item prediction result, $\hat{s}(t)$ represents the seasonal item prediction result, and $\epsilon_t$ represents the noise item.

In operation 206, all the component prediction results are accumulated to obtain the traffic prediction result for the second preset time period.

Operation 206 is substantially the same as operation 104 in the first embodiment and will not be described here to avoid repetition.

It should be noted that when the traffic data in the historical period covers fewer holidays (for example, the number of days for the traffic data is less than the number of days in a year, and the number of covered holidays is less than the number of holidays in a year), a better prediction effect may be obtained by adopting this embodiment.

Compared with the first embodiment, when this embodiment uses the time series model to process each of the component series respectively and obtain the component prediction result of each of the component series, specifically, a prophet model is used to decompose each of the component series into the sum of the trend term, the seasonal term and the noise term for fitting, and then the fitted prophet model is used to obtain the traffic prediction result. It is possible to predict the traffic according to trends of periodic changes and aperiodic changes of the traffic data at the same time by predict the component series using the prophet model, which improves accuracy of the traffic prediction.

A third embodiment of the present disclosure relates to a traffic prediction method. The third embodiment is substantially the same as the second embodiment, except that instead of decomposing each of component series into a sum of a trend term, a seasonal term, and a noise term, the third embodiment decomposes each of the component series into a sum of the trend item, the seasonal item, a holiday item, and the noise item. In the following operations, a fitted trend item, a fitted seasonal item and a fitted holiday item are determined respectively, and then the fitted trend item and the fitted seasonal item and the fitted holiday item are used to obtain prediction results of the trend item, the seasonal item and the holiday item in a second preset time period. The prediction results of the trend item, the seasonal item prediction result, the holiday item prediction result and the noise item are accumulated to obtain a component prediction result of each of the component series for the second preset time period.

Figure 4:
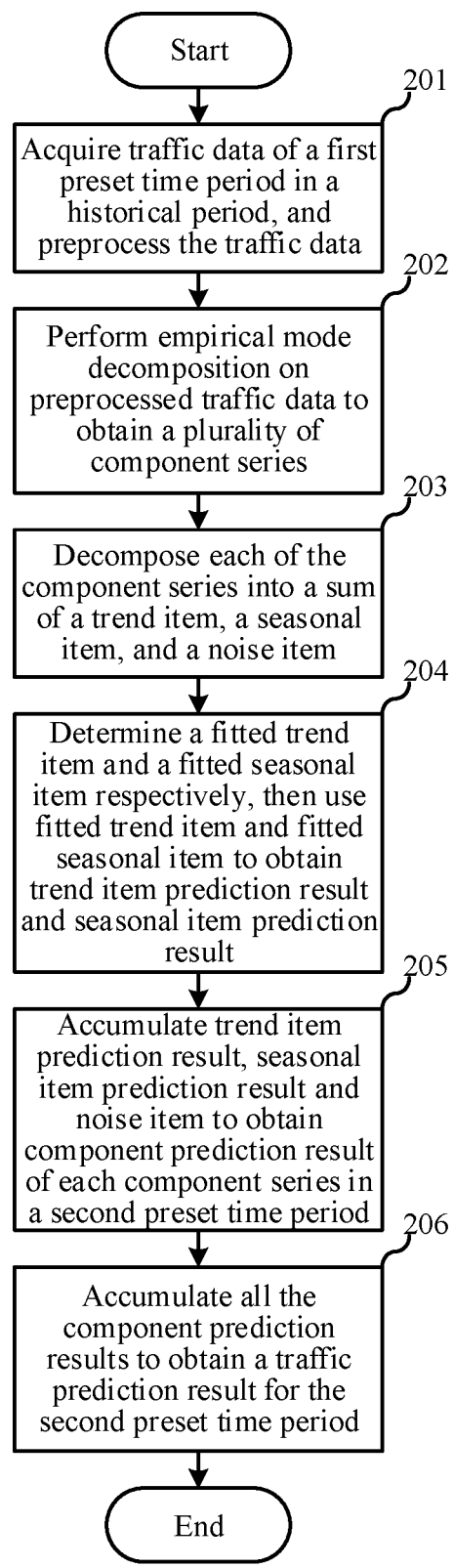
FIG. 4 is a flow diagram illustrating a traffic prediction method according to a second embodiment of the present disclosure.

The traffic prediction method in this embodiment is shown in FIG. 4, and specifically includes following operations.

In operation 301, traffic data of a first preset time period in a historical period is acquired, and the traffic data is preprocessed.

In operation 302, empirical mode decomposition is performed on preprocessed historical traffic data to obtain a plurality of component series.

Operations 301 to 302 are substantially the same as operations 101 to 102 in the first embodiment respectively and will not be described here to avoid repetition.

In operation 303, each of the component series is decomposed into the sum of the trend item, the seasonal item, the holiday item, and the noise item.

In this embodiment, the prophet model is used to predict each of the component series respectively to obtain the component prediction result of each of the component series.

Specifically, each of the component series is decomposed into the sum of the trend term, the seasonal term, and the noise term through STL decomposition, that is, $$y(t)=g(t)+s(t)+h(t)+\epsilon_t$$

where t represents time, y(t) represents the component series, g(t) represents the trend term, s(t) represents the seasonal term, and $\epsilon_t$ represents the noise term.

In operation 304, the fitted trend item, the fitted seasonal item and the fitted holiday item are determined respectively, and then the fitted trend item, the fitted seasonal item and the fitted holiday item are used to obtain the trend item prediction result, the seasonal item prediction result, and the holiday item prediction result for the second preset time period.

Specifically, fitting functions of the trend term, the seasonal term, and the noise term is similar to those of operation 204 in the second embodiment and are not repeated here.

In an exemplary embodiment, a fitting function of the holiday term h(t) is as follows:

$$h(t)=Z(t)\kappa$$

where, $\kappa$ is a normal distribution curve, $Z(t)=[1(t \in D_1), \ldots, 1(t \in D_L)]$, and for a Lth holiday, $D_L$ represents a time period during which the holiday has an impact.

In operation 305, the trend item prediction result, the seasonal item prediction result, the holiday item prediction result, and the noise item are accumulated to obtain the component prediction result of each of the component series.

Specifically, the trend item prediction result $\hat{g}(t)$, the seasonal item prediction result $\hat{s}(t)$ and the holiday item prediction result $\hat{h}(t)$ are obtained through operation 303, a random value following a normal distribution may be taken as the noise item $\epsilon_t$, and $\hat{g}(t)$, $\hat{s}(t)$, $\hat{h}(t)$ and $\epsilon_t$ are accumulated to obtain a component prediction result of a single component series, namely:

$$\hat{y}(t)=\hat{g}(t)+\hat{s}(t)+\hat{h}(t)+\epsilon_t$$

where, $\hat{y}(t)$ represents the component prediction result, $\hat{g}(t)$ represents the trend item prediction result, $\hat{s}(t)$ represents the seasonal item prediction result, $\hat{h}(t)$ represents the holiday item prediction result, $\epsilon_t$ represents the noise term.

In operation 306, all the component prediction results are accumulated to obtain a traffic prediction result.

Operation 306 is substantially the same as operation 104 in the first embodiment and will not be described here to avoid repetition.

It should be noted that when the traffic data in the historical period covers more holidays (for example, the number of days in the traffic data is more than the number of days in a year, and the number of covered holidays is more than the number of holidays in a year), a better prediction effect may be obtained by adopting this embodiment.

Compared with the second embodiment, when the prophet model is used to fit the component series, this embodiment decomposes each of the component series into the sum of the trend item, the seasonal item, the holiday item, and the noise item for fitting, and obtains the traffic prediction result according to the fitted prophet model. By retaining the holiday item of the prophet model when adopting the prophet model, the traffic prediction may be carried out according to the trend of periodic changes and aperiodic changes of the traffic data and the impact of holidays on the traffic data, which improves accuracy of the traffic prediction.

A fourth embodiment of the present disclosure relates to a traffic prediction method. The fourth embodiment is substantially the same as the first embodiment, except that, according to the fourth embodiment, the operation of fitting a plurality of component series by using a time series prediction mode includes: dividing all component series into a component training set and a component test set according to a preset step size; using the time series prediction model to fit component series of the component training set; and determining a prediction error of a fitted time series prediction model according to the component test set.

Figure 5:
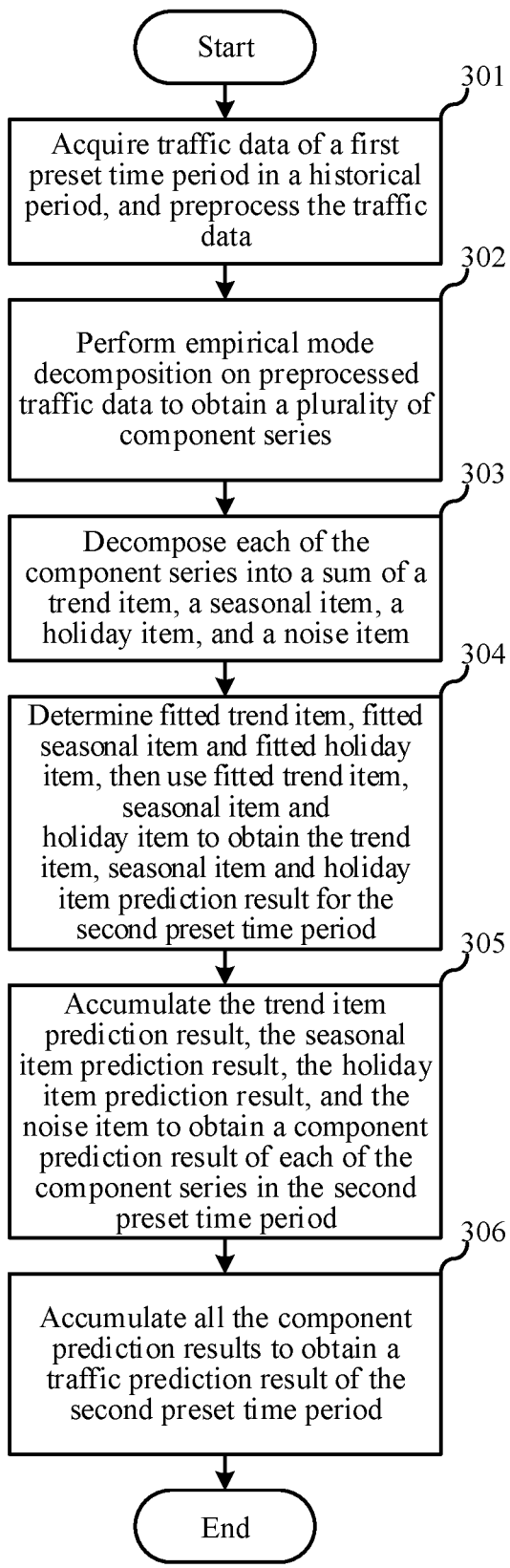
FIG. 5 is a flow diagram illustrating a traffic prediction method according to a third embodiment of the present disclosure.

The traffic prediction method in this embodiment is shown in FIG. 5, and specifically includes following operations.

In operation 401, traffic data of a first preset time period in a historical period is acquired, and the traffic data is preprocessed.

In operation 402, empirical mode decomposition is performed on preprocessed traffic data to obtain the plurality of component series.

Operations 401 to 402 are respectively substantially the same as operations 101 to 102 in the first embodiment and will not be described here to avoid repetition.

In operation 403, all the component series are divided into the component training set and the component test set according to the preset step size.

In an exemplary embodiment, dividing all the component series into the component training set and the component test set according to the preset step size in this embodiment may specifically include: taking a duration of the second preset time period as the preset step size; taking, as the component training set, a set of data at time points out of a time period of the preset step size before the current time in all the component series; taking, as the component test set, a set of data at time points within the time period of the preset step size before the current time in all the component series.

In a practical application scenario, it is assumed that traffic data in next 30 days of a plurality of cells managed by a base station is to be predicted, and EMD decomposition is performed on collected historical traffic data of the cells in the past 210 days. In this operation, since a target prediction step size is 30 days, component series of all the cells in the last 30 days of the past 210 days are used as the component test set, and component series of all the cells in first 180 days (the remaining component series) are used as the component training set.

In operation 404, the time series prediction model is used to fit the component series of the component training set.

This operation is roughly the same as operation 103 in the first embodiment, except that, in operation 103 of the first embodiment, the time series prediction model is used to fit each of the component series while in this operation, the time series prediction model is used to fit each of the component series in the component training set to obtain a fitted time series prediction model.

In operation 405, the prediction error of the fitted time series prediction model is determined according to the component test set.

In an exemplary embodiment, operation 403 is used to divide the component series to obtain the component training set and the component testing set. At this time, a traffic prediction result for the historical time period immediately before the current time is determined according to the fitted time series prediction model, where the duration of the historical time period equals to the preset step size. The prediction error of the fitted time series prediction model is determined according to the component test set and the traffic prediction result for the historical time period.

In an exemplary embodiment, prediction performance is evaluated by calculating a mean absolute percentage error (MAPE):

$$MAPE = \frac{|\hat{y}_t - y_t|}{y_t}$$

where, $\hat{y}_t$ is the traffic prediction result for the historical time period, and $y_t$ is the component series corresponding to the component test set.

In operation 406, a plurality of component prediction results for the second preset time period are obtained by using the fitted time series prediction model, and all the component prediction results are accumulated to obtain a traffic prediction result for the second preset time period.

Specifically, the fitted time series prediction model obtained in operation 404 is used to perform prediction for the second preset time period and obtain a plurality of component prediction results. The remaining operations are substantially the same as operation 104 in the first embodiment and will not be described here to avoid repetition.

Compared with the first embodiment, this embodiment divides the plurality of component series obtained by EMD decomposition into the component training set and the component test set. The component training set is used to determine the fitted time series prediction model, and the component test set is used to evaluate prediction accuracy of the time series prediction model after the component training set is fitted. The prediction accuracy of the time series prediction model is evaluated by cross-validation, so that the model may be retrained when the prediction accuracy of the model is low to ensure that the prediction accuracy reaches an ideal state.

The operations of the above various methods are divided only for purpose of describing clearly and may be combined into one operation or some operations may be split into a plurality of operations during implementation. As long as the same logical relationship is included, they are all within the protection scope of the present disclosure. Adding insignificant modifications to an algorithm or process or introducing insignificant designs without changing the core design of the algorithm and process are all within the protection scope of the present disclosure.

Figure 6:
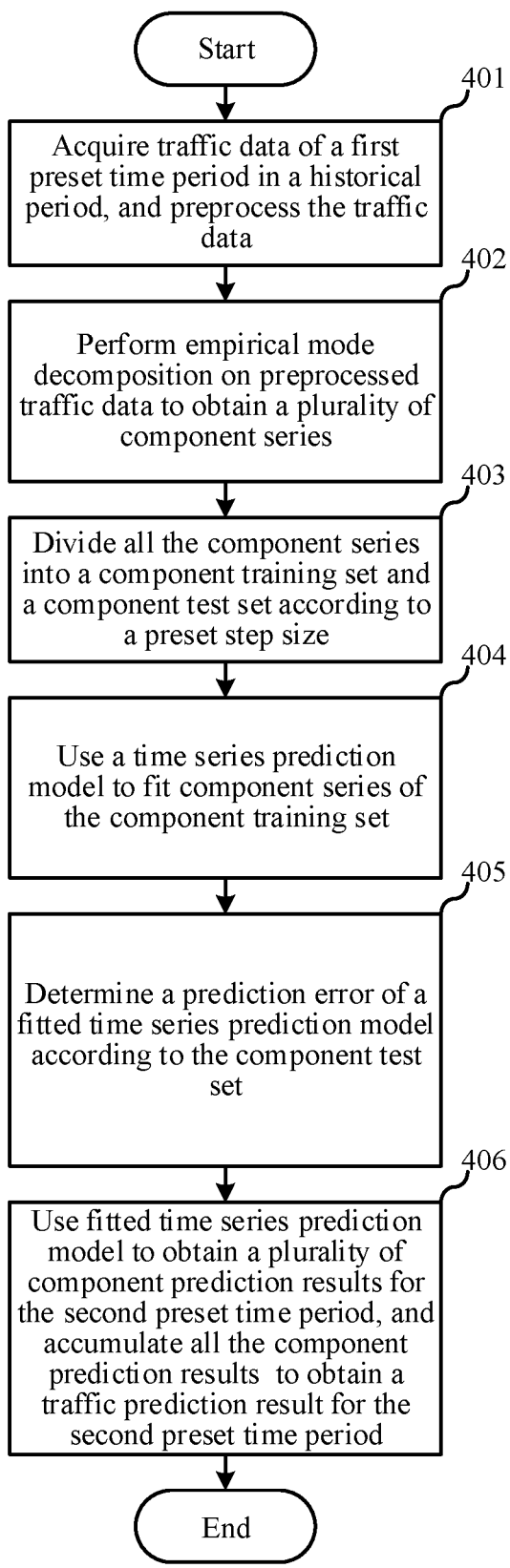
FIG. 6 is a flow diagram illustrating a traffic prediction method according to a fourth embodiment of the present disclosure.
Figure 7:
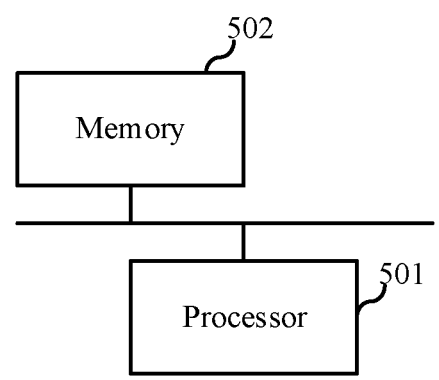
FIG. 7 is a schematic structural diagram illustrating a traffic prediction device according to a fifth embodiment of the present disclosure.

A fifth embodiment of the present disclosure relates to a traffic prediction device. As shown in FIG. 6, traffic prediction device includes at least one processor 501; and a memory 502 communicatively connected to the at least one processor 501; where the memory 502 stores an instruction executable by the at least one processor 501, and the instruction, when executed by at least one processor 501, causes the at least one processor 501 to perform the foregoing traffic prediction method embodiment.

The memory 502 and the processor 501 are connected by a bus, and the bus may include any number of interconnected buses and bridges, and the bus connects various circuits of one or more processors 501 and the memory 502 together. The bus may also connect together various other circuits, such as peripherals, voltage regulators, and power management circuits, which are well known in the art and therefore will not be described further herein. A bus interface provides an interface between the bus and a transceiver. The transceiver may be a single element or multiple elements, such as multiple receivers and transmitters, which provides a unit for communicating with various other devices over a transmission medium. Data processed by the processor 501 is transmitted over a wireless medium through an antenna. In an exemplary embodiment, the antenna also receives and transmits the data to the processor 501.

The processor 501 is configured for managing the bus and general processing, and may also provide various functions, including timing, peripheral interface, voltage regulation, power management, and other control functions. The memory 502 may be used to store data used by the processor 501 when performing operations.

Some embodiments of the present disclosure further provide a computer-readable storage medium storing a computer program that, when executed by a processor, causes the processor to perform the foregoing traffic prediction method embodiment.

That is, those skilled in the art would understand that all or part of the operations in the method for performing the above embodiments may be completed by instructing a relevant hardware through a program. The program is stored in a storage medium and includes several instructions to make a device (may be a single chip microcomputer, a chip, etc.) or a processor to perform all or part of the operations of the methods described in the various embodiments of the present disclosure. The aforementioned storage medium includes: a U disk, a mobile hard disk, a read-only memory (ROM), a random access memory (RAM), a magnetic disk or optical disk and other medium that can store program codes.

Those of ordinary skill in the art can understand that the above-mentioned embodiments are specific examples for realizing the present disclosure, and in practical applications, various changes can be made in form and details without departing from the spirit and scope of the present disclosure.

What is claimed is:

1. A traffic prediction method, comprising:
acquiring and preprocessing traffic data of a first preset time period in a historical period to obtain preprocessed traffic data;
performing empirical mode decomposition on the preprocessed traffic data to obtain a plurality of component series;
using a time series prediction model to fit the plurality of component series to obtain a plurality of fitted component series;
using the plurality of fitted component series to obtain a plurality of component prediction results for a second preset time period; and
accumulating the plurality of component prediction results to obtain a traffic prediction result for the second preset time period;
wherein using the time series prediction model to fit the plurality of component series to obtain a plurality of fitted component series, and using the plurality of fitted component series to obtain the plurality of component prediction results for the second preset time period, comprises:
  with respect to each component series of the plurality of component series:
    decomposing the each component series into a trend term, a seasonal term and a noise term, such that the each component series is represented by a sum of the trend term, the seasonal term and the noise term;
    determining a fitted trend item and a fitted seasonal item respectively, and then using the fitted trend item and the fitted seasonal item to obtain a trend item prediction result and a seasonal item prediction result for the second preset time period; and
    accumulating the trend item prediction result, the seasonal item prediction result and the noise item to obtain a component prediction result of the each component series for the second preset time period.

2. The traffic prediction method according to claim 1, wherein acquiring the traffic data of the first preset time period in the historical period comprises:
  acquiring traffic data of each day of the first preset time period in the historical period, wherein the traffic data of each day includes a traffic value when a utilization rate of physical resource blocks is largest within 24 hours of the day.

3. The traffic prediction method according to claim 1, wherein preprocessing the traffic data comprises:
  processing abnormal data in the traffic data by using a boxplot method.

4. The traffic prediction method according to claim 1, wherein using the time series prediction model to fit the plurality of component series to obtain a plurality of fitted component series and using the plurality of fitted component series to obtain the plurality of component prediction results for the second preset time period comprises:
  with respect to each component series of the plurality of component series:
    decomposing the each component series into a trend term, a seasonal term, a holiday term and a noise term, such that the each component series is represented by a sum of the trend term, the seasonal term, the holiday term and the noise term;
    determining a fitted trend item, a fitted seasonal item and a fitted holiday item, and then using the fitted trend item, the fitted seasonal item and the fitted holiday item to obtain a trend item prediction result, a seasonal item prediction result and a holiday item prediction result for the second preset time period; and
    accumulating the trend item prediction result, the seasonal item prediction result, the holiday item prediction result, and the noise item to obtain a component prediction result of the each component series for the second preset time period.

5. The traffic prediction method according to claim 1, wherein using the time series prediction model to fit the plurality of component series comprises:
  dividing the plurality of component series into a component training set and a component test set according to a preset step size;
  using the time series prediction model to fit component series of the component training set to obtain fitted component series of the component training set; and
  determining a prediction error of the fitted component series of the component training set according to the component test set.

6. The traffic prediction method according to claim 5, wherein, dividing the plurality of component series into the component training set and the component test set according to the preset step size comprises:
  taking a duration of the second preset time period as the preset step size;
  taking, as the component training set, a set of data in the plurality of component series at time points out of a time period with a duration of the preset step size immediately before current time; and
  taking, as the component test set, a set of data in the plurality of component series within the time period with the duration of the preset step size immediately before the current time.

7. The traffic prediction method according to claim 6, wherein determining the prediction error of the fitted component series of the component training set according to the component test set comprises:
  determining a traffic prediction result for a historical time period immediately before the current time according to the fitted component series of the component training set, wherein a duration of the historical time period equals to the preset step size; and
  determining the prediction error of the fitted component series of the component training set according to the component test set and the traffic prediction result for the historical time period.

8. A traffic prediction device, comprising:
  at least one processor; and,
  a memory communicatively connected to the at least one processor; wherein,
    the memory stores an instruction executable by the at least one processor, wherein the instruction, when executed by the at least one processor, causes the at least one processor to perform a traffic prediction method, wherein the traffic prediction method comprises:
      acquiring and preprocessing traffic data of a first preset time period in a historical period to obtain preprocessed traffic data;
      performing empirical mode decomposition on the preprocessed traffic data to obtain a plurality of component series;
      using a time series prediction model to fit the plurality of component series to obtain a plurality of fitted component series, and using the plurality of fitted component series to obtain a plurality of component prediction results for a second preset time period; and
      accumulating the plurality of component prediction results to obtain a traffic prediction result for the second preset time period[H]i
        wherein using the time series prediction model to fit the plurality of component series to obtain a plurality of fitted component series, and using the plurality of fitted component series to obtain the plurality of component prediction results for the second preset time period, comprises:
          with respect to each component series of the plurality of component series:
            decomposing the each component series into a trend term, a seasonal term and a noise term, such that the each component series is represented by a sum of the trend term, the seasonal term and the noise term;

determining a fitted trend item and a fitted seasonal item respectively, and then using the fitted trend item and the fitted seasonal item to obtain a trend item prediction result and a seasonal item prediction result for the second preset time period; and accumulating the trend item prediction result, the seasonal item prediction result and the noise item to obtain a component prediction result of the each component series for the second preset time period.

9. A non-transitory computer-readable storage medium storing a computer program that, when executed by a processor, causes the processor to perform a traffic prediction method, wherein the traffic prediction method comprises:

acquiring and preprocessing traffic data of a first preset time period in a historical period to obtain preprocessed traffic data;

performing empirical mode decomposition on the preprocessed traffic data to obtain a plurality of component series;

using a time series prediction model to fit the plurality of component series to obtain a plurality of fitted component series, and using the plurality of fitted component series to obtain a plurality of component prediction results for a second preset time period; and accumulating the plurality of component prediction results to obtain a traffic prediction result for the second preset time period;

wherein using the time series prediction model to fit the plurality of component series to obtain a plurality of fitted component series, and using the plurality of fitted component series to obtain the plurality of component prediction results for the second preset time period, comprises:

with respect to each component series of the plurality of component series:

decomposing the each component series into a trend term, a seasonal term and a noise term, such that the each component series is represented by a sum of the trend term, the seasonal term and the noise term;

determining a fitted trend item and a fitted seasonal item respectively, and then using the fitted trend item and the fitted seasonal item to obtain a trend item prediction result and a seasonal item prediction result for the second preset time period; and accumulating the trend item prediction result, the seasonal item prediction result and the noise item to obtain a component prediction result of the each component series for the second preset time period.

10. The traffic prediction device according to claim 8, wherein acquiring the traffic data of the first preset time period in the historical period comprises:

acquiring traffic data of each day of the first preset time period in the historical period, wherein the traffic data of each day includes a traffic value when a utilization rate of physical resource blocks is largest within 24 hours of the day.

11. The traffic prediction device according to claim 8, wherein, preprocessing the traffic data, comprises:

processing abnormal data in the traffic data by using a boxplot method.

12. The traffic prediction device according to claim 8, wherein using the time series prediction model to fit the plurality of component series to obtain a plurality of fitted component series, and using the plurality of fitted component series to obtain the plurality of component prediction results for the second preset time period, comprises:

with respect to each component series of the plurality of component series:

decomposing the each component series into a trend term, a seasonal term, a holiday term and a noise term, such that the each component series is represented by a sum of the trend term, the seasonal term, the holiday term and the noise term;

determining a fitted trend item, a fitted seasonal item and a fitted holiday item, and then using the fitted trend item, the fitted seasonal item and the fitted holiday item to obtain a trend item prediction result, a seasonal item prediction result and a holiday item prediction result for the second preset time period; and accumulating the trend item prediction result, the seasonal item prediction result, the holiday item prediction result, and the noise item to obtain a component prediction result of the each component series for the second preset time period.

13. The traffic prediction device according to claim 8, wherein using the time series prediction model to fit the plurality of component series comprises:

dividing the plurality of component series into a component training set and a component test set according to a preset step size;

using the time series prediction model to fit component series of the component training set to obtain fitted component series of the component training set; and determining a prediction error of the fitted component series of the component training set according to the component test set.

14. The traffic prediction device according to claim 13, wherein dividing the plurality of component series into the component training set and the component test set according to the preset step size comprises:

taking a duration of the second preset time period as the preset step size;

taking, as the component training set, a set of data in the plurality of component series at time points out of a time period with a duration of the preset step size immediately before current time; and taking, as the component test set, a set of data in the plurality of component series within the time period with the duration of the preset step size immediately before the current time.

15. The traffic prediction device according to claim 14, wherein determining the prediction error of the fitted component series of the component training set according to the component test set comprises:

determining a traffic prediction result for a historical time period immediately before the current time according to the fitted component series of the component training set, wherein a duration of the historical time period equals to the preset step size; and determining the prediction error of the fitted component series of the component training set according to the component test set and the traffic prediction result for the historical time period.

16. The non-transitory computer-readable storage medium according to claim 9, wherein using the time series prediction model to fit the plurality of component series to obtain a plurality of fitted component series, and using the plurality of fitted component series to obtain the plurality of component prediction results for the second preset time period, comprises:

with respect to each component series of the plurality of component series:

decomposing the each component series into a trend term, a seasonal term, a holiday term and a noise term, such that the each component series is represented by a sum of the trend term, the seasonal term and the noise term;

determining a fitted trend item, a fitted seasonal item and a fitted holiday item, and then using the fitted trend item, the fitted seasonal item and the fitted holiday item to obtain a trend item prediction result, a seasonal item prediction result and a holiday item prediction result for the second preset time period; and accumulating the trend item prediction result, the seasonal item prediction result, the holiday item prediction result, and the noise item to obtain a component prediction result of the each component series for the second preset time period.

17. The non-transitory computer-readable storage medium according to claim 9, wherein using the time series prediction model to fit the plurality of component series comprises:

dividing the plurality of component series into a component training set and a component test set according to a preset step size;

using the time series prediction model to fit component series of the component training set to obtain fitted component series of the component training set; and determining a prediction error of the fitted component series of the component training set according to the component test set.

* * * * *